United States Patent [19]

Feltz et al.

[11] Patent Number: 5,014,248

[45] Date of Patent: May 7, 1991

[54] AIR-DELIVERABLE, ICE-PENETRATING SONOBUOY

[75] Inventors: Louis V. Feltz; Eric W. Reece; Clarence W. Young, all of Albuquerque, N. Mex.; Thigpen Lewis, Dracut, Mass.

[73] Assignee: The United States of America as represented by the Secretary of the Navy, Washington, D.C.

[21] Appl. No.: 441,202

[22] Filed: Feb. 5, 1974

[51] Int. Cl.[5] .............. H04B 1/59

[52] U.S. Cl. .............. 367/4

[58] Field of Search .............. 340/2, 5 R, 6 R, 16 R, 340/17; 9/8 R; 367/4; 114/326; 441/33

[56] References Cited

U.S. PATENT DOCUMENTS

| | | | |
|---|---|---|---|
| 2,629,083 | 2/1951 | Mason et al. | 367/3 |
| 3,093,808 | 6/1963 | Tatnall et al. | 367/4 |
| 3,213,409 | 10/1965 | Bailey et al. | 367/4 |
| 3,275,976 | 9/1966 | Farmer | 367/4 |
| 3,290,642 | 12/1966 | Mason et al. | 367/4 |
| 3,360,772 | 12/1967 | Massa | 340/17 |
| 3,368,480 | 2/1968 | Payne et al. | 367/4 |
| 3,377,615 | 4/1968 | Lutes | 367/4 |
| 3,460,058 | 8/1969 | Taplin | 367/4 |
| 3,474,405 | 10/1969 | Padberg, Jr. | 340/16 R |
| 3,541,498 | 11/1970 | Dale et al. | 367/4 |
| 3,602,471 | 8/1971 | Reed | 248/156 |
| 3,646,505 | 2/1972 | Kirby | 367/4 |
| 3,671,928 | 6/1972 | Schultz | 367/4 |
| 3,711,821 | 1/1973 | Dale | 367/3 |

*Primary Examiner*—Daniel T. Pihulic
*Attorney, Agent, or Firm*—Michael J. McGowan; Prithvi C. Lall

[57] ABSTRACT

An air-deliverable, ice-penetrating sonobuoy vehicle has three-parts—a penetrator, instrument compartment, and antenna sphere. The parts are connected by frangible couplings which allow separation of the parts upon impact with the surface. The penetrator has a biconic nose-tip which forms a cavity in the ice, having a diameter only slightly larger than the diameter of the penetrator. When the larger diameter instrument compartment contacts the surface, frontal loadings will sever a frangible joint and thereby separate the penetrator from the instrument compartment. The antenna sphere, which has an even larger diameter, will separate from the instrument compartment in a like manner, except for an electrical connection. The antenna shpere has an eccentric ballast and will remain on the surface, transmitting signals from a hydrophone which is automatically released from the instrument compartment. The sonobuoy can also be used in open water.

10 Claims, 1 Drawing Sheet

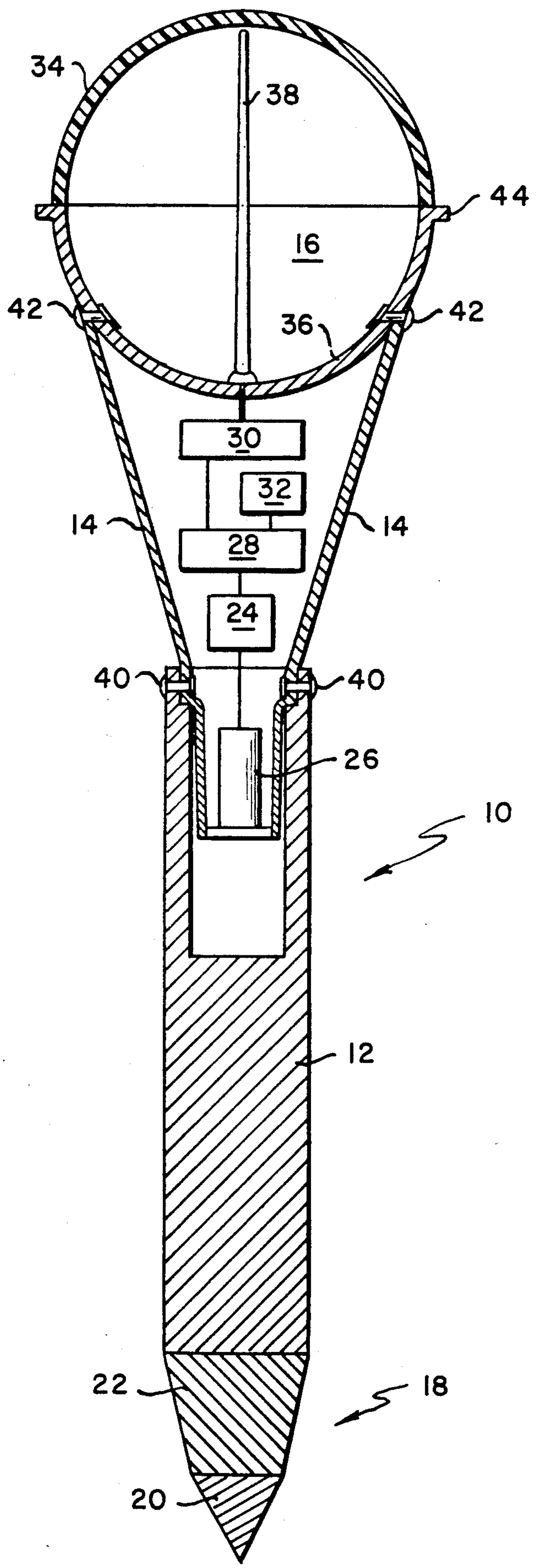
34
38
44
16
42
36
42
30
32
14
28
14
24
40
40
26
10
12
22
18
20

AIR-DELIVERABLE, ICE-PENETRATING SONOBUOY

BACKGROUND OF THE INVENTION

The present invention relates generally to air-deliverable buoys and more particularly to sonobuoys that can be dropped from the air and are capable of penetrating ice and automatically deploying their equipment for operation. Air-launched buoys are useful in several fields such as oceanography and antisubmarine warfare.

The deployment of sonar devices in the water over a wide area is one method of detecting submarines and other underwater objects. Air-dropping of such devices is quite common in current ASW (anti-submarine warfare) systems. Proper launching of sonobuoys from aircraft flying at relatively high velocities requires a compact, ballistic configuration. Upon immersion into the ocean the sonobuoy must automatically deploy into an operational configuration. Typically, the sonobuoy automatically lowers a device to an operating depth for receiving, transmitting and/or measuring some underwater phenomena. In ASW sonobuoys the device deployed is usually a hydrophone for projecting or receiving sound intelligence.

Various patents have issued on air-deliverable sonobuoys in the past. Some examples are U.S. Pat. Nos. 3,213,409; 3,275,976; 3,290,642: and 3,368,480. The buoys disclosed in these patents are air-deliverable and deploy automatically using pyrotechnic and/or mechanical systems that are activated upon impact or immersion.

In recent years the need has arisen for an air-deliverable sonobuoy that is not only capable of automatic deployment in water, but also in water covered by a thick layer of ice. Such an environment requires that the sonobuoy have an ice-penetrating capability not possessed by air-deliverable buoys developed in the past.

SUMMARY OF THE INVENTION

The present invention provides a sonobuoy that has a compact, streamlined configuration for air delivery, yet is capable of penetrating thick ice and automatically deploying itself. By employing successively larger housing structures connected by frangible couplings to a penetrator, the sonobuoy actually uses the resultant impact forces with ice and/or water to separate and deploy itself. An instrument compartment or housing contains a conventional hydrophone and transmitting equipment connected to an antenna mounted in an antenna sphere that is eccentrically ballasted. A special biconic nose-tip is designed primarily for water only or water and very thin ice.

An object of the present invention is to provide a sonobuoy that is deliverable by air and capable of automatic deployment both in ice and water.

Another object is to eliminate complicated mechanical and pyrotechnic deployment mechanisms from a sonobuoy that is automatically deployable.

A further object of the invention is to stabilize the antenna housing of a sonobuoy.

Yet another object is to provide an automatically deliverable sonobuoy adapted for free fall from an aircraft.

Other objects, advantages and novel features of the invention will become apparent from the following detailed description of the invention when considered in conjunction with the accompanying drawings.

BRIEF DESCRIPTION OF THE DRAWING

The FIGURE illustrates in cross section a preferred embodiment of the invention depicting conventional components in block-diagram form.

DESCRIPTION OF THE PREFERRED EMBODIMENT

The FIGURE, which illustrates a preferred embodiment of the invention, shows an air-deliverable, ice-penetrating sonobuoy in cross section in its compact configuration ready for air drop. The sonobuoy has three main parts —a penetrator 12, instrument housing 14, and antenna housing 16. The penetrator 12 has a biconic nose-tip 18 on its forward end. The nose-tip has two sections, a leading, conical tip 20 and frusto-conical rear section 22. Frusto-conical as used herein means shaped like the frustum of a cone. The base angle of the leading section 20 is smaller than the base angle of section 22. The two sections 22 and 20 may, for example, be screwed or welded together, or integrally formed in any suitable manner. The biconic nose-tip 18 may be connected to the rest of the cylindrical penetrator 12 in like manner. They may be metal or other suited material.

In the preferred embodiment, the upper portion of the penetrator 12 is hollow. A conventional hydrophone 26 is supported by a sideways-extending strut member 25 when the sonobuoy is in its compact configuration as shown. A wire connects the hydrophone to a reel 24, which is connected to a transmitter 28. The transmitter 28 is connected to power supply 32 and is a free-standing coil 30. Coil 30 is connected to a whip antenna 38 mounted in antenna housing 16. Suitable mounting clips, not shown, can be employed to hold the antenna in place. Of course, other suitable mounting means could be employed with the same or different types of antennas, depending on the application.

The antenna housing 16 in the preferred embodiment is composed of two hemispherical shells 34 and 36. One of the shells is heavier than the other to give the sphere an eccentric ballast. The ballast is preferably provided by making one shell 34 of polyurethane foam and the other 36 of aluminum. The antenna is attached firmly to the lower hemisphere and the entire hemisphere foamed to provide support to prevent the antenna from buckling on high deceleration impacts.

A circumferential flange 44 is included as part of the hemispherical shell 36 to provide stabilized flight and to enhance separation of antenna housing 16 from the instrument housing 14.

Shear pins 40 and 42 connect the penetrator 12 and antenna housing 16 to instrument housing 14. Other frangible couplings may also be employed. The important thing is that the coupling allow the instrument housing to separate from the penetrator and the antenna housing to separate from the instrument housing when the two housing successively impact the ice or water.

In operation the sonobuoy in its compact configuration as shown is dropped from an aircraft. The outer shape of the sonobuoy will tend to stabilize and direct its flight so that the biconic nose-tip 18 makes contact with the ice first. The penetrator 12 will make a hole in the ice only slightly larger than its diameter or width. Fins may be added to the instrument housing to increase aerodynamic stability. The instrument housing 14 will follow the penetrator 12 into the ice. The outer shape of the instrument housing 14 is also frusto-conical. Moreover, the greatest width of housing 14 is larger than the greatest width of penetrator 12. Therefore, as housing 14 enters the ice, frontal loadings on its outer surface due to the impact will sever the shear pins 40 and separate instrument housing 14 from the penetrator 12. The penetrator and instrument housing will continue to penetrate the ice, the penetrator sinking when it enters the water. The housing 14 is buoyant and will float at the top of the water. The housing 14 itself could be made of some buoyant material or air could be trapped in sealed compartments (not shown) to make the housing float. The reel 24 which contains a roll of wire simply allows the hydrophone 26 to drop to operational depth. Since the instrument housing may pentrate the ice, the antenna housing, due to its even larger diameter or width will also encounter impact forces when it hits the ice that will rupture shear pins 42. The sphere which will also float will be free to move away from the instrument housing. The excess wire required will simply come off the free-standing coil 30. The antenna housing will be deposited at the surface of thick ice or, if it has broken through the ice, will reappear floating in the hole made by the original impact. The aluminum shell 36 will give the housing 16 an eccentric ballast and absorb much of the impact. By selecting impact velocities and maximum widths for the various components, frontal loadings can be controlled to assure proper deployment. Of course, the sonobuoy could be used in open water as well as ice-covered water. The sonobuoy electronics for this ice-penetrating sonobuoy are similar to those commonly used for open water sonobuoys.

Obviously, many modifications and variations of the present invention are possible in light of the above teachings. It is therefore to be understood that, within the scope of the appended claims, the invention may be practiced otherwise than as specifically described.

What is claimed is:

1. An air-deliverable sonobuoy comprising;

a penetrator;

an instrument housing having a maximum width greater than the maximum width of the penetrator;

an antenna housing having a maximum width greater than the maximum width of the instrument housing;

means for normally connecting said penetrator to said instrument housing and said instrument housing to said antenna housing, and responsive to impact forces on said instrument housing and antenna housing to allow separation of said penetrator, instrument housing and antenna housing; and means originally mounted within the sonobuoy for receiving and transmitting signals.

2. The air-deliverable sonobuoy of claim 1 wherein said penetrator includes a biconic, pentrating nose-tip located at one end of said penetrator.

3. The air-deliverable sonobuoy of claim 2 wherein the antenna housing comprises two hemispherical shells joined together to form a spherical housing, one of said shells being heavier than the other.

4. The air-deliverable sonobuoy of claim 3 wherein one hemispherical shell is made of polyurethane foam and the other of aluminum.

5. The air-deliverable sonobuoy of claim 4 wherein the outer shape of the instrument housing is frusto-conical, and the remainder of the penetrator connected to the nose-tip is cylindrical.

6. The air-deliverable sonobuoy of claim 1 wherein the antenna housing comprises two hemispherical shells joined together to form a spherical housing, one of said shells being heavier than the other.

7. The air-deliverable sonobuoy of claim 6 wherein one hemispherical shell is made of polyurethane foam and the other of aluminum.

8. The air-deliverable sonobuoy of claim 7 wherein the outer shape of the instrument housing is frusto-conical and the part of the penetrator beyond the nose-tip is cylindrical.

9. The air-deliverable sonobuoy of claim 1 further including a nose-tip connected to one end of said penetrator, said nose-tip having a conical leading portion and a frusto-conical rear portion, the base angle of the conical portion being smaller than the base angle of the frusto-conical rear portion.

10. The air-deliverable sonobuoy of claim 9 wherein the antenna housing comprises two hemispherical shells joined together to form a spherical housing, one of said shells being heavier than the other.

* * * * *